United States Patent [19]

Rashid

[11] Patent Number: 5,013,995

[45] Date of Patent: May 7, 1991

[54] PROGRAMMABLE CURRENT LIMIT CURVE

[75] Inventor: Abdul Rashid, Rockford, Ill.

[73] Assignee: Sundstrand Corporation, Rockford, Ill.

[21] Appl. No.: 429,787

[22] Filed: Oct. 30, 1989

[51] Int. Cl.$^5$ .............................................. H02P 9/00
[52] U.S. Cl. ......................................... 322/25; 322/28
[58] Field of Search ........................ 322/19, 20, 22, 23, 322/24, 25, 27, 28, 59, 60, 72, 73, 77, 99, 100; 307/84

[56] References Cited

U.S. PATENT DOCUMENTS

| | | | |
|---|---|---|---|
| 3,878,400 | 4/1975 | McSparran | 322/23 X |
| 4,044,296 | 8/1977 | Dhyanchand et al. | 322/25 |
| 4,245,183 | 1/1981 | Glennon | 322/28 |
| 4,446,417 | 5/1984 | Fox et al. | 322/28 X |
| 4,477,765 | 10/1984 | Glennon et al. | 322/20 |
| 4,559,487 | 12/1985 | Sims et al. | 322/24 |
| 4,608,639 | 8/1986 | Morishita et al. | 322/23 X |

FOREIGN PATENT DOCUMENTS

| | | | |
|---|---|---|---|
| 0218899 | 12/1983 | Japan | 322/25 |
| 0481099 | 2/1976 | U.S.S.R. | 322/28 |

*Primary Examiner*—Steven L. Stephan
*Assistant Examiner*—Kristine Peckman
*Attorney, Agent, or Firm*—Wood, Phillips, Mason, Recktenwald & VanSanten

[57] ABSTRACT

The problems of modifying and/or fine tuning current limit in a voltage regulator are minimized using a programmable current limit. The programmable current limit provides for storage of multiple reference values in a processor memory to provide different rates of current limit control.

13 Claims, 4 Drawing Sheets

PROGRAMMABLE CURRENT LIMIT CURVE

FIELD OF THE INVENTION

This invention relates to electrical power generating systems and, more particularly, to an improved current limit control therefor.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency. The constant speed drive includes a speed control assembly and receives mechanical input power at varying speed from the aircraft engine and delivers power from its output shaft at constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components. Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and certain control and protection functions are controlled by a microprocessor. As such, the control system is inherently more flexible in implementing different control schemes. In a digital control system the control unit contains a microprocessor and associated software and continuously and sequentially checks for proper system conditions and for control commands, and performs the automatic or command and control functions. However, the actual flexibility available with such a digital system is limited due to limitations in processing time available in the microprocessor for performing both control and protection functions. In fact, known GCU systems employ an analog control for implementing the voltage regulator functions. As a result, it is necessary to provide circuit components associated with voltage regulation.

Additional problems result in the design of generator control units. In each application it is necessary to develop a cost effective, lightweight solution. Therefore, the designer must start from "scratch" in designing a generator control unit for each new application. This results in each generator control unit being custom made and therefore more expensive.

A typical analog voltage regulator circuit includes a current limit circuit which compares peak sensed current to peak allowable phase current. When the sensed peak current exceeds a preselected reference value of, for example, 2.0 per unit current, then the control linearly reduces the voltage reference of the main voltage control loop up to a maximum peak current of, for example, 3.0 per unit, at which time the voltage reference is effectively reduced to zero. If current limit requirements change, however, these limit values can only be modified by altering circuit components. Also, owing to the strict linear relationship between current and voltage, the system may not react quickly under certain circumstances to limit current.

The present invention is directed to overcoming one or more of the problems discussed above.

SUMMARY OF THE INVENTION

In accordance with the invention, a voltage regulator is provided with a programmable current limit function.

Broadly, there is disclosed herein a voltage regulator for a generating system having a main generator and an exciter providing field current to the main generator. The voltage regulator comprises means for sensing generator output voltage and current and means for developing a setpoint representing a desired generator output voltage. A voltage control means is responsive to the voltage sensing means and the voltage reference means for controlling the exciter to regulate the output of the main generator. Current limit means are responsive to the current sensing means and coupled to the voltage reference means for reducing the setpoint at two distinct rates according to a level that the sensed current is above the current limit value.

It is a feature of the invention that the main generator develops polyphase output power and the current sensing means includes means for sensing the highest phase current in the main generator output.

It is another feature of the invention that the current limit means reduces the setpoint at a relatively high rate if the sensed current is above a first current limit value and at a relatively low rate if the sensed current is above a second current limit value, which is higher than the first current limit value.

It is a further feature of the invention that the current limit means includes means for developing a current error and means responsive to the current error for controlling the setpoint to minimize the error.

In accordance with another aspect of the invention a voltage regulator is disclosed in connection with a generating system having a main generator which develops an output power, an exciter providing field current to a field winding of the main generator, and a permanent magnet generator for providing field current to a field winding of the exciter. The exciter field current is controlled in accordance with a control signal which controls the exciter to regulate the output of the main generator. The voltage regulator includes means for sensing generator output voltage and current. A processor is responsive to the sensed voltage for establishing the control signal in accordance with a programmed control algorithm and including a current limit algorithm responsive to sensed current for limiting the control signal in accordance with the difference between sensed current and a plurality of preselected limit values. A programmable memory is connected with the processor and stores the preselected limit values for retrieval by the processor in performing the current limit algorithm.

In accordance with a further aspect of the invention there is disclosed herein an improvement in a voltage regulator for an electrical power generating system having a main generator and an exciter providing field current to the main generator, a voltage sensor for sensing actual generator output voltage, a current sensor for sensing actual generator output current, and means for developing a setpoint representing a desired generator output voltage. The improvement comprises voltage control means coupled to the voltage sensor and the developing means for controlling the exciter to regulate the output of the main generator, and current limit means coupled to the current sensors and to the developing means for reducing the setpoint at a first rate if the sensed current is above a first current limit value and at a second rate if the sensed current is above a second current limit value.

Specifically, there is disclosed herein a voltage regulator including a current limit algorithm which is programmable to provide a current limit curve having two separate linear ramps of differing slopes.

The system receives a signal representing the current per phase and determines the maximum of the three currents. This maximum is compared to three set point values. The first two set point values represent the end points of the first ramp. Since the two ramps intersect, the second set point value also represents one end point of the second ramp, with the third set point value representing the other end point of the second ramp. According to the level of the maximum current, the current limit error level is determined based on one of two equations, each having a select slope. This error value is compensated and represents the voltage setpoint for voltage regulation.

Further features and advantages of the invention will readily be apparent from the specification and from the drawings.

DESCRIPTION OF THE INVENTION

Figure 1:
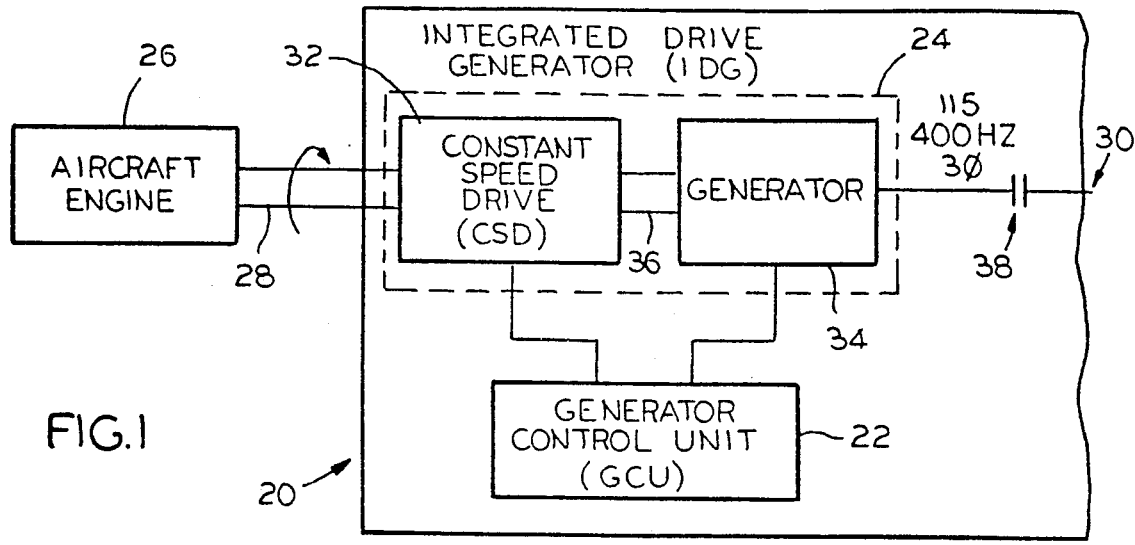
FIG. 1 is a simplified block diagram for an aircraft electrical power generating system (EPGS) including a generator control unit having a voltage regulator implementing a current limit function according to the invention.

With reference to FIG. 1, a block diagram representation illustrates an electrical power generating system (EPGS) 20 including a generator control unit (GCU) 22 according to the invention. In the illustrated embodiment, the EPGS 20 is used in an aircraft for providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30. The IDG 24 includes a constant speed drive 32 and a generator 34. The constant speed drive 32 receives mechanical input power from the shaft 28 at varying speed and delivers power from its output shaft 36 at constant speed. The generator 34 is driven by the shaft 36 and develops output power through suitable fault protection circuits represented by a generator relay or contactor, illustrated schematically at 38, to the bus 30.

Figure 2:
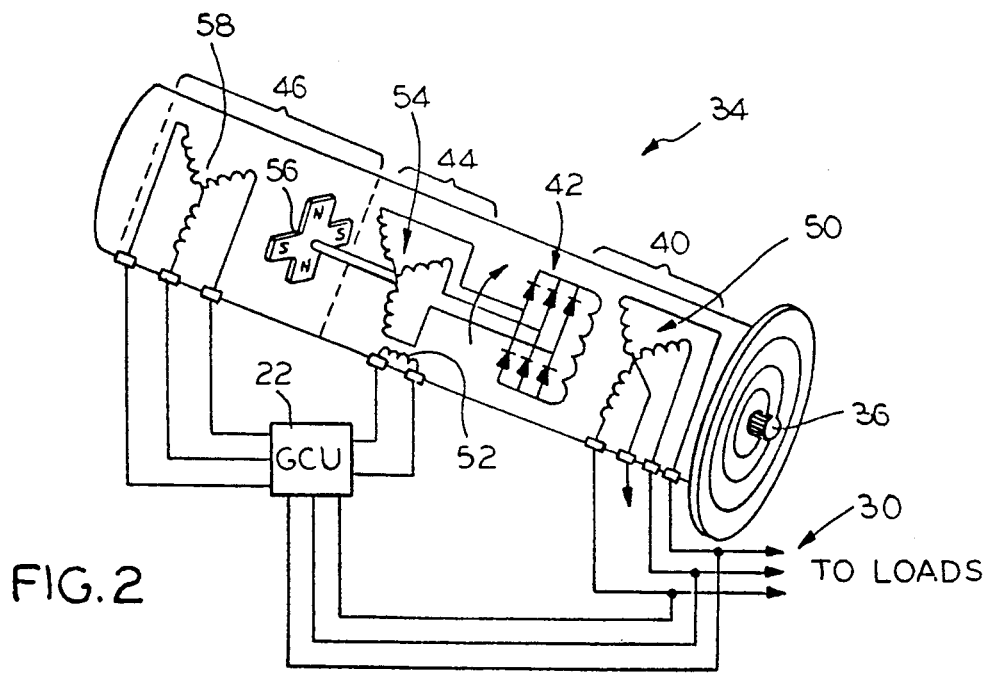
FIG. 2 is a combined schematic and perspective view of an EPGS generator.

With reference also to FIG. 2, the generator 34 includes a main generator 40, a rotating rectifier bridge assembly 42, an AC exciter 44 and a permanent magnet generator (PMG) 46. Each of the main generator 40, AC exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The AC exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 16 is a pilot generator in which field flux is provided by a permanent magnet 56 mounted on a rotor driven by the shaft 36 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32 results in generation of a polyphase voltage in the exciter armature windings 54 as they traverse the magnetic field set up by the exciter DC field winding 52. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 3:
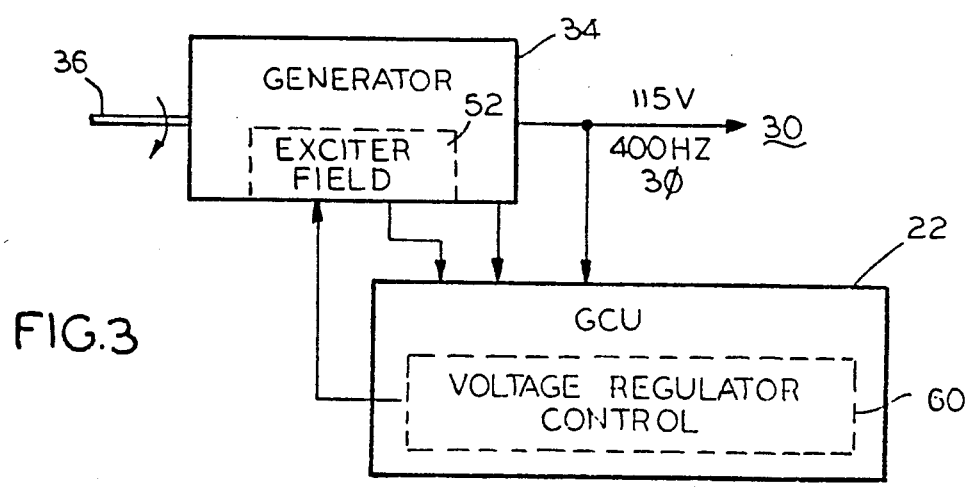
FIG. 3 is a simplified block diagram of a voltage regulation control loop.

With reference also to FIG. 3, a block diagram illustrates a control loop for regulating excitation to the exciter DC field winding 52. Specifically, a voltage regulator control 60 in the GCU 22 controls generator output voltage at a point of regulation (POR) using sensors for sensing system conditions, such as voltage and current. The GCU 22 regulates the energy coupled from the exciter field winding 52 to the exciter armature winding 54 and ultimately to the main generator 40.

Although the voltage regulator control 60 in the illustrated embodiment is used in connection with an IDG, the control 60 could as well be used with other EPGS's, such as, for example, a variable speed constant frequency (VSCF) generating system, as will be ous to those skilled in the art.

Figure 4:
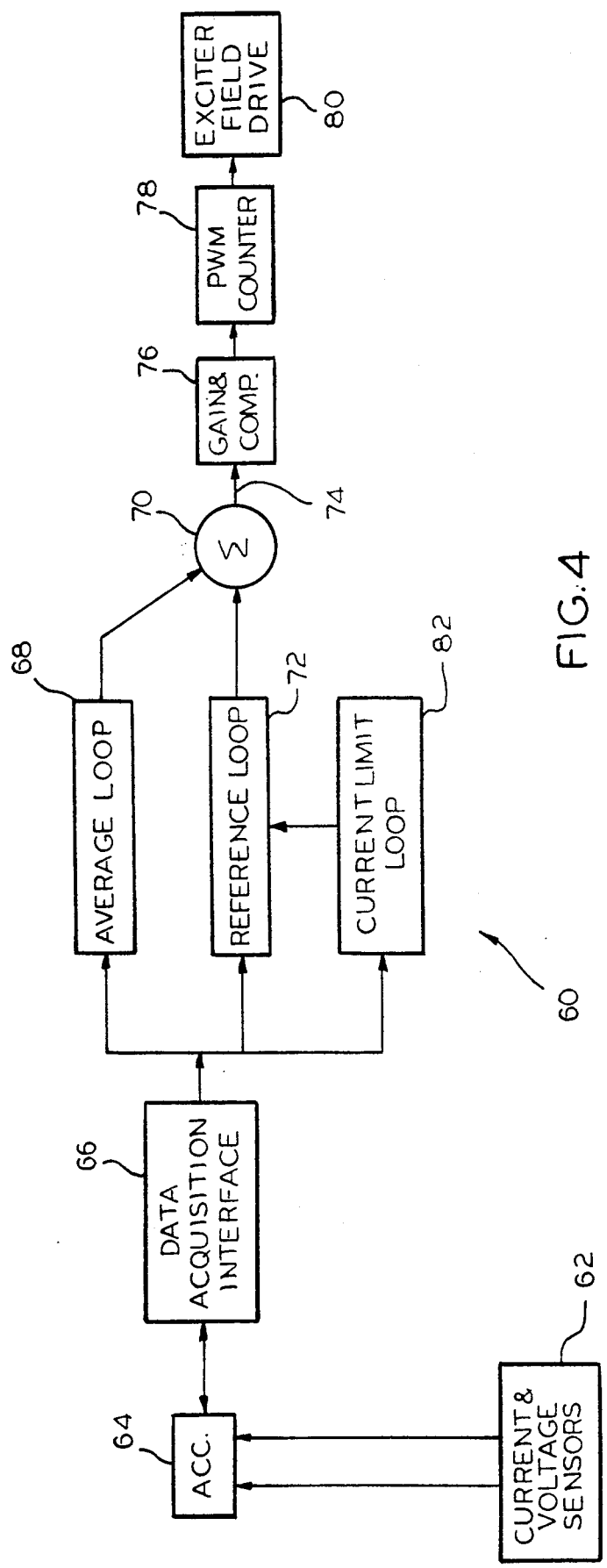
FIG. 4 is a detailed block diagram of the control loops implemented in the voltage regulator of FIG. 3.

With reference to FIG. 4, a block diagram illus the control loops implemented by the voltage regulator control 60, see FIG. 3. The generator's three phase current and voltage signals are sensed at the point of regulation by sensors 62, see FIG. 3, are conditioned by an analog control circuit 64 and are then sampled by the voltage regulator 60 via a data acquisition interface 66. This information is processed by an average loop 68 and applied to a first summer 70 which also receives a reference value from a reference loop 72. The summer 70 calculates an error on a line 74 representing the difference between the POR voltage input and the POR voltage reference. The error is compensated by a gain and compensation function block 76 and applied to a pulse width modulation (PWM) counter 78. The compensated error alters the PWM duty cycle of an exciter field drive switching circuit 80 which in turn varies the field current to the exciter field winding 52, see FIG. 3.

During a short circuit in the EPGS 20, see FIG. 1, a current limit loop 82 connected to the reference loop 72 decreases the POR voltage reference in order to allow a controlled amount of current to flow through the fault.

Figure 5:
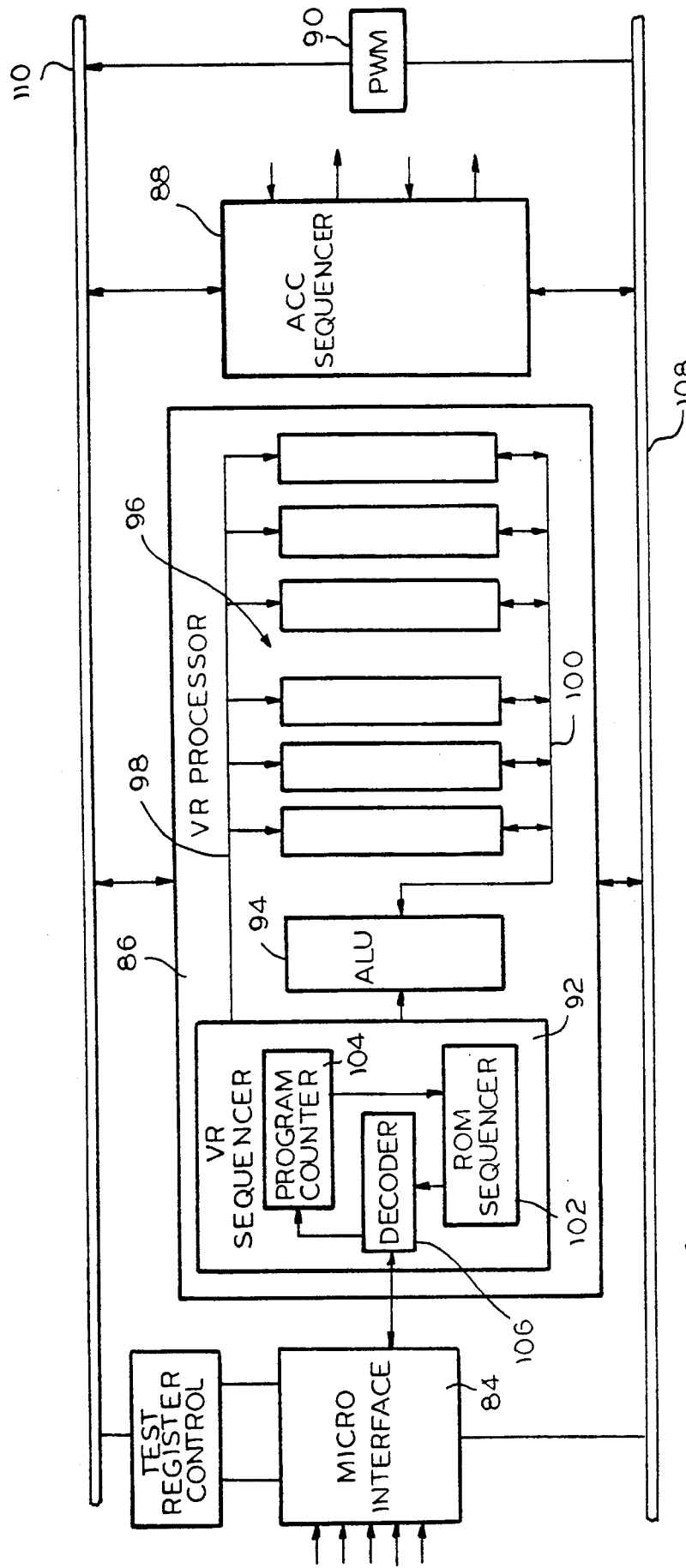
FIG. 5 is a block diagram for a digital voltage regulator circuit.

With reference to FIG. 5, a generalized block diagram illustrates the architecture of the circuit implementation for the voltage regulator 60. The principal circuit function elements comprise a processor interface circuit 84, a processor 86, an analog control chip sequencer circuit 88 and a pulse width modulation drive circuit 90 which communicate on an address bus 108 and a data bus 110.

The processor interface circuit 84 is an interface module that controls the data transfer between a system microprocessor, not shown, and the voltage regulator 60. Programmable and readable registers and RAM memory within the voltage regulator 60 are mapped to a memory address interface with the system microprocessor for chip initialization, built-in-test function, debug and test operations. Microprocessor interface operations to the voltage regulator 60 are primarily performed during chip initialization which takes place immediately after system reset.

The voltage regulator processor 86 interfaces with all of the other voltage regulator circuits and performs all calculations and temporary storage of internal variables. The components of the processor 86 are a sequencer 92, an arithmetic logic unit (ALU) 94, and a plurality of memory circuits 96. The sequencer 92 controls the loop functions. Any of the loop functions, namely, current limit, reference loop and the average loop can be accessed by the sequencer 92. The sequencer 92 sends out a request, the loop function then performs its task, and it returns an acknowledge flag for completion. The sequencer's algorithm is centered around the POR average voltage loop, as discussed above.

The sequencer 92 includes a ROM based sequencer 102 controlled by a program counter 104. The ROM based sequencer 102 implements the control loops and filter control. A decoder 106 receives information from the ROM based sequencer 102, the microprocessor interface 84 and through internal multiplexer circuits (not shown) for communicating with the program counter 104 which sends stepping instructions to the ROM based sequencer 102. A multiplexer circuit (not shown) sends out requests from the sequencer internally within the processor 86.

The arithmetic logic unit 94 is used to perform six point multiplication, addition, subtraction, etc. The sequencer 92 and arithmetic logic unit 94 communicate with the voltage regulator memory 96 via an internal address bus 98 and data bus 100. The memory 96 is divided into a first section containing constants and a second section containing variables generated by the voltage regulator processor 86.

The ACC sequencer circuit 88 is used to provide an interface to the analog control circuit 64, see FIG. 4. Specifically, the ACC sequencer 88 is a ten-bit interface which communicates with a ten-bit analog/digital converter of the analog control circuit 64, and a multiplexer consisting of twelve channels.

The PWM circuit 90 is a peripheral circuit which is free-running after a completion flag is issued. The PWM circuit 90 provides a controlling output to the exciter field via the drive circuit 80, see FIG. 4, for regulation of the system voltage. It accepts the calculated input from the voltage regulator loops which determine the characteristics of the square wave output.

Figure 6:
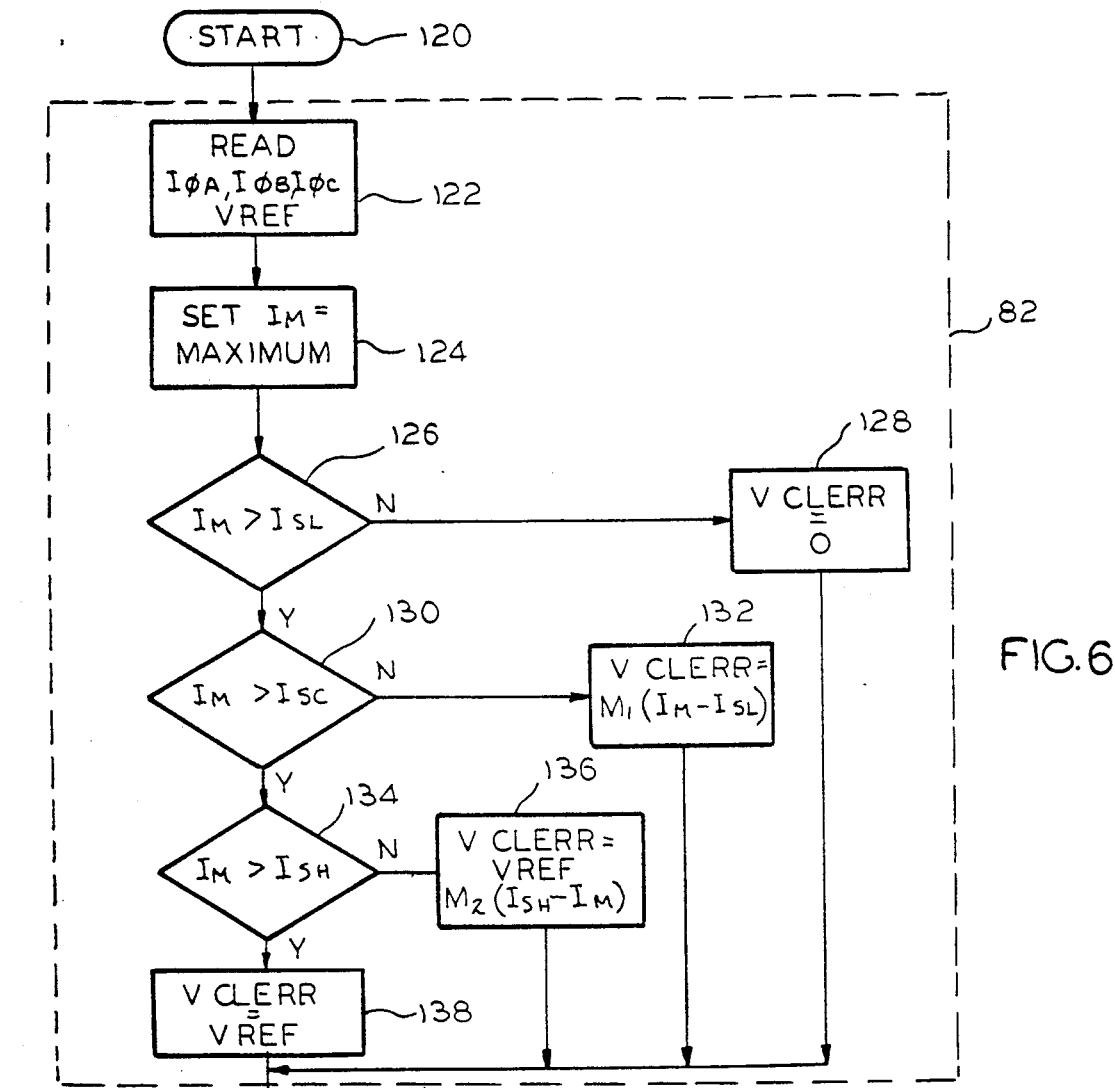
FIG. 6 is a flow diagram illustrating implementation of the control loops of FIG. 4 by the sequencer of FIG. 5.

With reference to FIG. 6, a flow diagram illustrates implementation of the control loops of FIG. 4 by the processor 86. Specifically, the flow diagram represents an algorithm stored in the ROM based sequencer 102 which is stepped through in accordance with stepping instructions received from the program counter 104 using variables which may be read from the memory circuits 98.

Control function during each cycle starts at a start block 120. In connection therewith, various test functions and the like may be performed. Thereafter, the current limit loop 82 is implemented beginning at a block 122 which reads from RAM memory the stored values representing the current for each of the three phases, as determined by the sensor 62, see FIG. 3, and also reads a POR voltage reference value VREF. The VREF value is also a memory stored value which might be received from the system microprocessor at initialization, or loaded from an external analog device, such as a potentiometer controller.

At a block 124 a value $I_M$ is set equal to the maximum of the three sensed current values. A decision block 126 then determines if the maximum current $I_M$ is greater than a first current reference $I_{SL}$. The current reference $I_{SL}$ represents the minimum current at which current limit is implemented. If not, then at a block 128 a value VCLERR is set equal to zero. The value VCLERR represents an amount which the voltage reference should be reduced to implement the current limit function.

If the maximum current $I_M$ is greater than the first reference $I_{SL}$, as determined at the decision block 126, then a decision block 130 determines if the maximum current $I_M$ is greater than a second current reference $I_{SC}$. If the result is no, indicating that the maximum current is between the first and second reference values $I_{SL}$ and $I_{SC}$, then the variable VCLERR is determined at a block 132 in accordance with the following equation:

$$VCLERR = M1(I_M - I_{SL}) \qquad (1)$$

If the maximum current $I_M$ is greater than the second reference $I_{SC}$, as determined at the decision block 130, then a decision block 134 determines if the maximum current $I_M$ is greater than a third current reference $I_{SH}$. If not, indicating that the maximum current is between the second and third references $I_{SC}$ and $I_{SH}$, then at a block 136 the variable VCLERR is determined in accordance with the following equation:

$$VCLERR = VREF - M2(I_{SH} - I_M) \qquad (2)$$

If it is determined at the decision block 134 that the maximum current $I_M$ is greater than the third reference $I_{SH}$, then the variable VCLERR is set equal to the voltage reference VREF at a block 138 to complete the current limit loop 82.

From any of the blocks 128, 132, 136 and 138, control advances to the reference loop 72 which determines an effective voltage reference variable VEREF by subtracting the value VCLERR from the preselected voltage reference VREF, at a block 140. At a block 142 a first gain and compensation function is performed on the effective voltage reference to provide stability of control. Thereafter, the average voltage loop 68 is implemented at a block 144. Specifically, the average voltage loop reads data representing the POR voltage and subtracts the same from the compensated effective voltage reference to determine the error which is compensated by a second gain and compensation function at a block 146. Thereafter, the PWM output is loaded at a block 148 and then control returns at a block 150 to begin the next cycle of operation.

Figure 7:
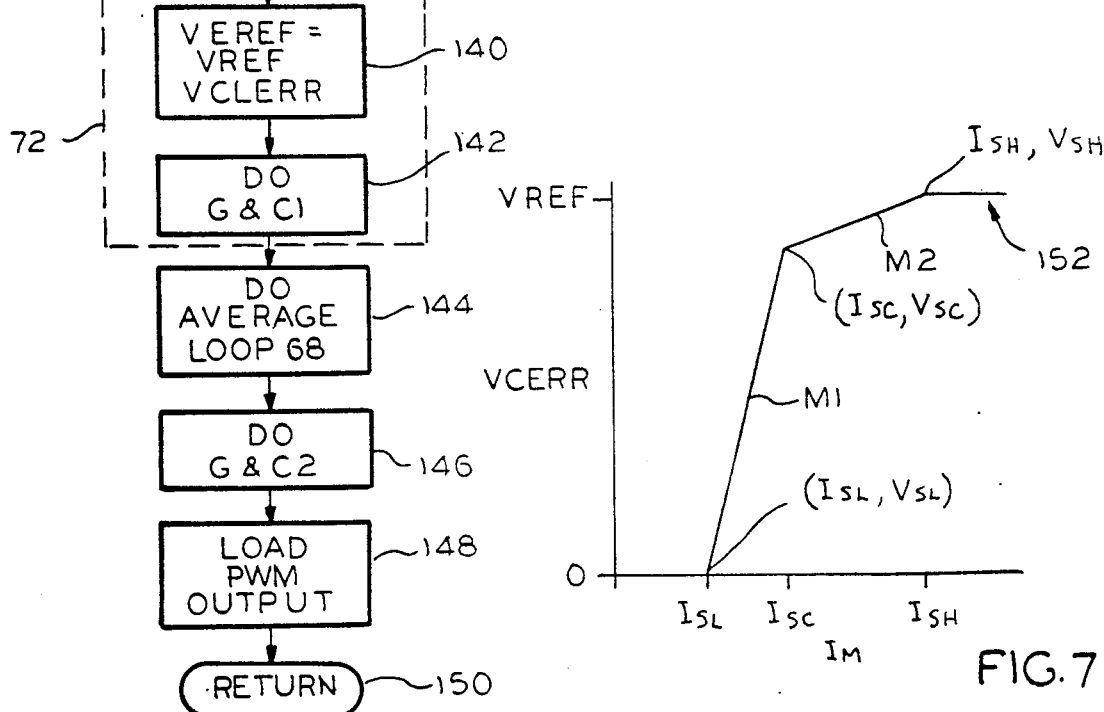
FIG. 7 is a curve illustrating operation of the current limit function according to the invention.

The effect of the current limit loop 82 is particularly illustrated by a multi-ramp curve 152 shown in FIG. 7. Advantageously, the voltage reference should initially be dropped sharply during fault current conditions, and then subsequently more slowly. The current limit curve 152 provides such an operation. Specifically, the curve 152 is highly sensitive between the first and second current reference values $I_{SL}$ and $I_{SC}$ represented by the steep slope of the curve 152 therebetween providing a high rate of current limiting. The current limit loop is less sensitive at current values between the second and third references $I_{SC}$ and $I_{SH}$, represented by the less steep slope of the curve 152 therebetween resulting in a lower rate of current limit function. Specifically, the values M1 and M2, see blocks 132 and 136 of FIG. 6, represent the slopes of the curve 152 for the first and second ramp portions. At values above the third reference $I_{SH}$, the current is flat and is equal to the reference value VREF.

The end points of each of the two ramps, which intersect at a common point represented by the second current reference $I_{SC}$, and a preselected voltage value $V_{SC}$, can be user selected and stored in the processor memory circuits 96. As a result, the current limit function is inherently flexible and permits changes in the curve slopes, and the positions at which the slopes take effect, to be easily modified without redesign. Similarly, additional ramp portions could be readily added to provide greater control flexibility, as will be obvious to those skilled in the art.

Thus, the invention broadly comprehends a programmable current limit curve in a voltage regulator which is operable to provide an initial sharp drop of generator output voltage, and subsequently a slower drop in system output voltage in response to current fault conditions.

The foregoing embodiment is illustrative of the broad inventive concepts contemplated by the invention.

I claim:

1. A voltage regulator for a generating system having a main generator and an exciter providing field current to the main generator, comprising:
   voltage sensing means for sensing generator output voltage;
   current sensing means for sensing generator output current;
   voltage reference means of developing a setpoint representing desired generator output voltage;
   voltage control means responsive to said voltage sensing means and said voltage reference means for controlling the exciter to regulate the output voltage of the main generator; and
   current limit means responsive to said current sensing means and coupled to said voltage reference means for reducing said setpoint at one of two distinct rates, the rate used being selected according to a level that the sensed current is above a first current limit value.

2. The voltage regulator of claim 1 wherein the main generator develops polyphase output power and wherein said current sensing means includes means for sensing the highest phase current in the main generator output.

3. The voltage regulator of claim 1 wherein said current limit means reduces said setpoint at a relatively high rate if the sensed current is above said first current limit value and at a relatively low rate if the sensed current is above a second current limit value, which is higher than said first current limit value.

4. The voltage regulator of claim 1 wherein said current limit means includes means for developing a current error and means responsive to said current error for controlling said setpoint to minimize said error.

5. In a generating system having a main generator which develops output power, an exciter providing field current to a field winding of the main generator, and a permanent magnet generator for providing field current to a field winding of the exciter, said exciter field current being controlled in accordance with a control signal which controls the exciter to regulate the output of the main generator, a voltage regulator comprising:
   voltage sensing means for sensing generator output voltage;
   current sensing means for sensing generator output current;
   a processor responsive to said sensed voltage for establishing the control signal in accordance with a programmed control algorithm and including a current limit algorithm responsive to said sensed current for limiting the control signal in accordance with a difference between sensed current and a plurality of preselected limit values; and a programmable memory connected with said processor and storing said preselected limit values for retrieval by said processor in performing said current limit algorithm.

6. The voltage regulator of claim 5 wherein the main generator develops polyphase output power and wherein said current sensing means includes means for sensing the highest phase current in the main generator output.

7. The voltage regulator of claim 5 wherein said current limit algorithm limits said control signal at a first rate if the sensed current is above a first current limit value and at a second rate if the sensed current is above a second current limit value, which is higher than said first current limit value.

8. The voltage regulator of claim 7 wherein said first rate is higher than said second rate.

9. The voltage regulator of claim 5 wherein said current limit algorithm develops a current error representing the difference between said sensed current and one of said preselected values and includes a gain and compensation function responsive to said current error for limiting said control signal to minimize said error.

10. In a voltage regulator for an electrical power generating system having a main generator and an exciter providing field current to the main generator, a voltage sensor for sensing generator output voltage, a current sensor for sensing generator output current, and means for developing a setpoint representing desired generator output voltage, the improvement comprising:

voltage control means coupled to said voltage sensor and said developing means for controlling the exciter to regulate the output of the main generator; and current limit means coupled to said current sensor and to said developing means for reducing said setpoint at a first rate if the sensed current is above a first current limit value and at a second rate if the sensed current is above a second current limit value.

11. The improvement of claim 10 wherein the main generator develops polyphase output power and wherein said current limit means includes means for determining the highest phase current in the main generator output.

12. The improvement of claim 10 wherein said current limit means reduces said setpoint at a relatively high rate if the sensed current is above the first current limit value and at a relatively low rate if the sensed current is above the second current limit value, which is higher than said first current limit value.

13. The improvement of claim 10 wherein said current limit means includes means for developing a current error and means responsive to said current error for controlling said setpoint to minimize said error.

* * * * *